United States Patent
Roos

(10) Patent No.: US 7,665,771 B2
(45) Date of Patent: Feb. 23, 2010

(54) FLEXIBLE HEADER JOINT

(76) Inventor: Jerry Roos, Box 98, 7 - 2151 Douglas, Merritt, British Columbia (CA) V1K 1B8

(*) Notice: Subject to any disclaimer, the term of this patent is extended or adjusted under 35 U.S.C. 154(b) by 0 days.

(21) Appl. No.: 11/741,525

(22) Filed: Apr. 27, 2007

(65) Prior Publication Data
US 2007/0236009 A1    Oct. 11, 2007

Related U.S. Application Data

(63) Continuation-in-part of application No. 11/053,943, filed on Feb. 10, 2005, now abandoned.

(60) Provisional application No. 60/542,844, filed on Feb. 10, 2004.

(51) Int. Cl.
*F16L 21/00*    (2006.01)
(52) U.S. Cl. .................. 285/236; 285/224; 285/237; 60/322
(58) Field of Classification Search .............. 285/223, 285/224, 236, 237, 235; 60/322
See application file for complete search history.

(56) References Cited

U.S. PATENT DOCUMENTS

| | | | | |
|---|---|---|---|---|
| 763,101 | A * | 6/1904 | Jones | 138/120 |
| 969,254 | A * | 9/1910 | Dor-Delattre | 285/223 |
| 1,407,211 | A * | 2/1922 | Miner | 285/231 |
| 2,459,918 | A * | 1/1949 | Chester | 285/148.26 |
| 3,063,741 | A * | 11/1962 | Bockerman | 285/283 |
| 3,670,844 | A * | 6/1972 | Penfold, Jr. | 181/240 |
| 4,502,189 | A * | 3/1985 | Sieberkrob et al. | 285/424 |
| 4,856,822 | A * | 8/1989 | Parker | 285/62 |
| 5,328,209 | A * | 7/1994 | Cromwell | 285/1 |
| 6,931,843 | B2 | 8/2005 | Gilli | |

* cited by examiner

*Primary Examiner*—David E Bochna
(74) *Attorney, Agent, or Firm*—Fasken Martineau DuMoulin LLP

(57) ABSTRACT

A flexible header joint for a high performance automobile is provided, wherein the first end of the joint receives a header collector and the second end of the joint receives an exhaust pipe. A cylindrical clamp maintains the joint in position to the header collector, the clamp having three spring retainers circumferentially positioned around the clamp. When the automobile is in motion, the clamp allows for the header to twist and rotate relative to the exhaust pipe while still maintaining the seal and thus preventing leakage of exhaust.

7 Claims, 5 Drawing Sheets

FLEXIBLE HEADER JOINT

This application is a continuation-in-part of U.S. patent application Ser. No. 11/053,943 filed Feb. 10, 2005, now abandoned and which claims the benefit of U.S. Provisional Patent Application No. 60/542,844, filed Feb. 10, 2004. The two aforementioned applications are hereby incorporated by reference.

TECHNICAL FIELD

This invention relates to exhaust systems in automobiles, and more particularly to joints for high performance exhaust headers.

BACKGROUND

A common and inexpensive means of improving an automobile's performance is the addition of exhaust headers to the automobile's exhaust system. Exhaust headers improve performance of an automobile by reducing or eliminating backpressure from the exhaust system. When using exhaust headers, each cylinder in the automobile's motor emits exhaust through a separate cylinder exhaust pipe (instead of sharing an exhaust pipe with other cylinders, as is conventionally done). Each of these individual exhaust pipes lead into a collector, which in turn allows the exhaust to pass through an trailing exhaust pipe to the catalytic converter and muffler.

A common problem with high performance exhaust headers is the leakage of exhaust from the joint between the collector and the rest of the exhaust system (typically the joint is from the collector to the trailing exhaust pipe). This joint also acts as a reducer, as the diameter of the collector is typically larger than that of the rest of the exhaust system. This also increases pressure on the joint, as the exhaust is compressed in order to pass to the trailing exhaust pipe. It is common for this joint not to seal properly, thereby causing leakage. Furthermore, the seal on the joint is exposed to extremely high temperatures, frequent shaking, and movement of the engine within its mounts, further factors leading to the breakage of the seal and resultant leakage.

Flex type exhaust joints are commonly used in production vehicles. Stock production flex joints do not adapt well to use with high performance headers, as they tend to require high ground clearance, and do not provide for exhaust flow efficiency.

One attempt to provide a flexible joint is disclosed in U.S. Pat. No. 5,328,209 to Cromwell, entitled "Vehicle Exhaust Stack Joint Yieldable in All Directions". Cromwell discloses a vertical joint, which is designed to pivot when the vertical exhaust pipe strikes a barrier such as a tree limb, and return to position when the barrier is passed. Such a joint fails to address the issues raised in performance header exhaust systems as it is designed to temporarily open (and thus leak) rather than maintain the exhaust pipe without leakage.

U.S. Pat. No. 6,931,843 to Gilli discloses an exhaust unit for engines, particularly for high performance vehicles. Gilli discloses a plurality of pipes (one from each cylinder) joined to a manifold having an equal number of pipes.

U.S. Pat. No. 3,063,741 to Bockerman discloses a yielding joint for exhaust pipes. Bockerman also discloses a joint for a vertical exhaust system designed to yield when the pipe strikes a barrier, such as a tree limb.

Other related art includes U.S. Pat. No. 5,683,119 to Emmons et al., disclosing a pipe joint and seal therefor, and U.S. Pat. No. 6,164,067 to Cronje, disclosing a knuckle joint for an exhaust system.

SUMMARY OF THE INVENTION

A flexible header joint for an automobile is provided, including a cylindrical pipe having a horizontal axis, said pipe shaped to receive a header collector horizontally at a first end to form a seal to prevent exhaust leakage and receive an exhaust pipe horizontally at a second end; and a first spring retainer circumferentially positioned on the pipe; a cylindrical clamp positioned near said first end of the pipe, and a spring retainer circumferentially positioned on the clamp and aligned with the spring retainer on the pipe; and a spring secured to the spring retainer positioned on the pipe and the spring retainer positioned on the clamp; wherein the clamp, when the header collector receives forces during operation of the automobile, maintains the seal to prevent exhaust leakage therefrom.

The flexible header joint may further include at least three spring retainers circumferentially positioned on said pipe on a common plane perpendicular to the axis; at least three spring retainers circumferentially positioned on the clamp, each of the spring retainers positioned on the clamp and aligned with a spring retainer positioned on the pipe; and at least three springs, a first end of each spring secured to one of the spring retainers positioned on said pipe and a second end of each spring secured to the spring retainer on the clamp aligned to the spring retainer on the pipe.

The flexible header joint may include a spring mount clamp having first and second mounts; and a pinch bolt. The spring retainers positioned circumferentially on the pipe may be positioned on a first plane perpendicular to said axis and the spring retainers positioned circumferentially on the clamp may be positioned on a second plane parallel to the first plane. The pipe may narrow from the first end to the second end in a stepped fashion and the clamp may include a first end and a second end separated by an opening.

BRIEF DESCRIPTION OF FIGURES

Further objects, features and advantages of the present invention will become more readily apparent to those skilled in the art from the following description of the invention when taken in conjunction with the accompanying drawings, in which.

DETAILED DESCRIPTION OF PREFERRED EMBODIMENTS

Figure 1:
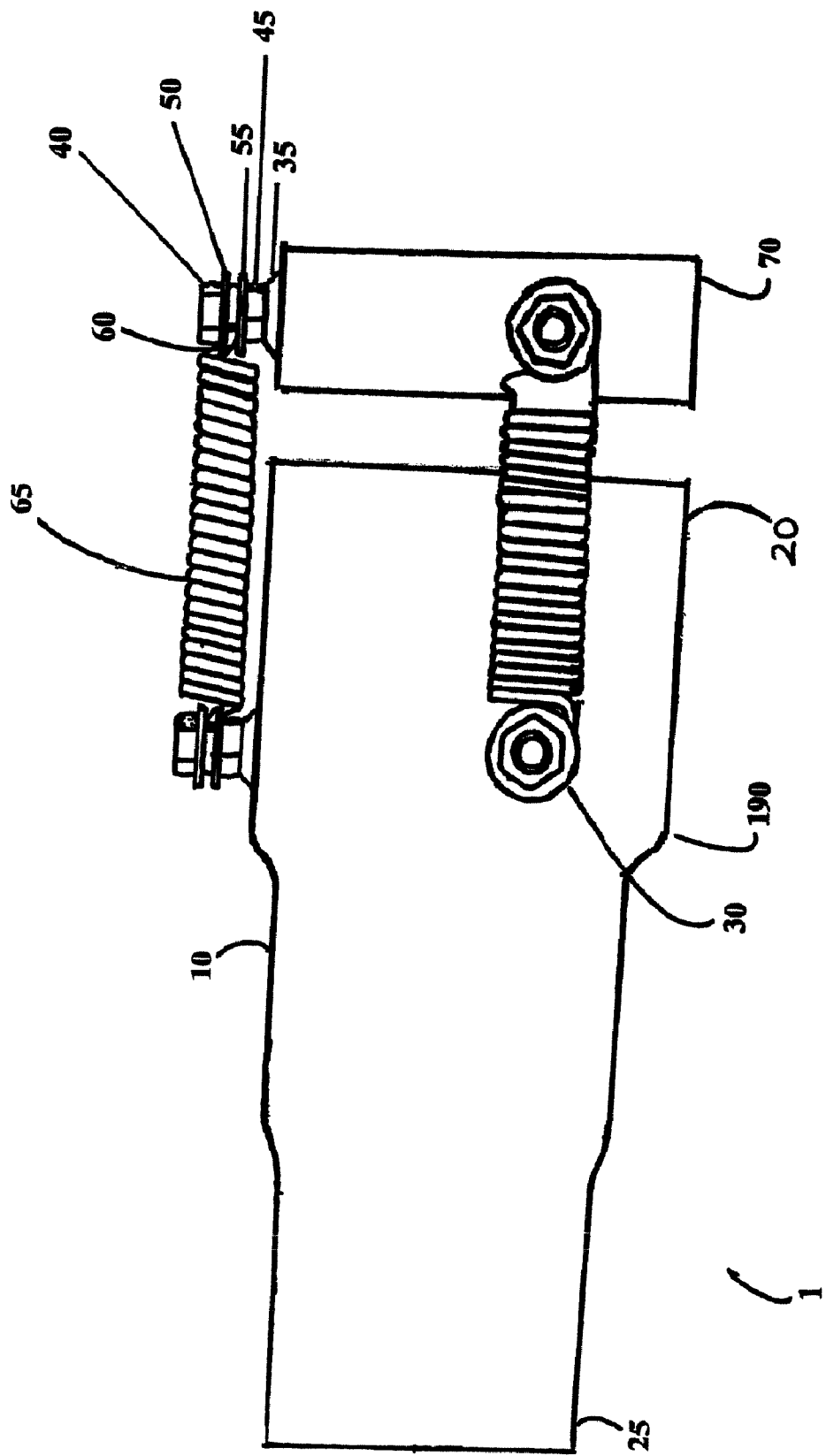
FIG. 1 is a side view of a flexible header joint according to the invention.
Figure 2:
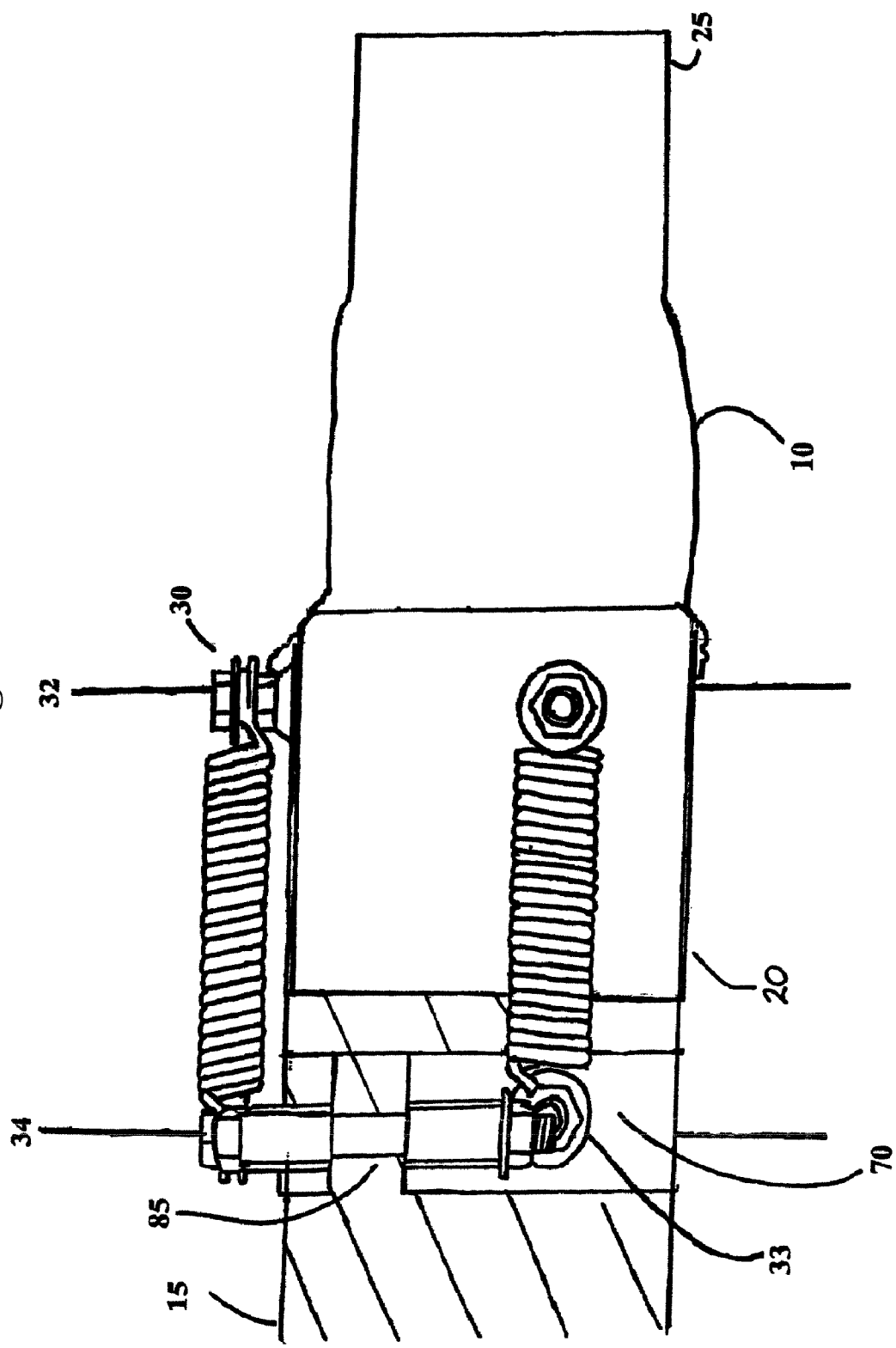
FIG. 2 is a reverse side view thereof, showing the spring retention clamp attached to the collector.
Figure 5:
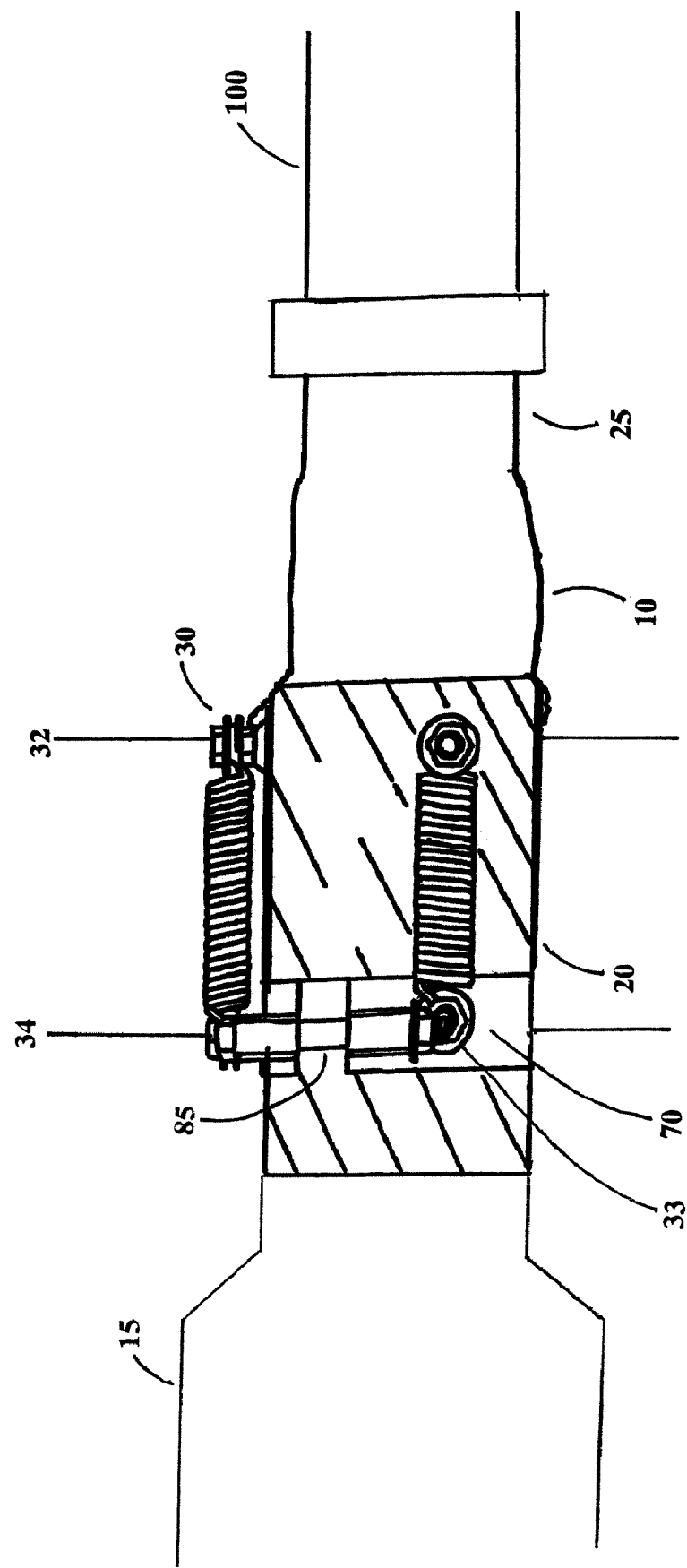
FIG. 5 is a side view showing the flexible header joint attached to an automobile exhaust system.

As best seen in FIGS. 1, 2 and 5, a flexible header joint 1 according to the invention includes a cylindrical pipe 10 generally shaped to receive header collector 15 snugly at first end 20, so as to form a seal between pipe 10 and collector 15 preventing leakage of exhaust, and an exhaust pipe 100 at second end 25. Collector 15 receives exhaust from a plurality of cylinder exhaust pipes (not shown). Pipe 10 preferably narrows as it approaches second end 25 from first end 20, typically in a stepped fashion. Circumferentially placed around pipe 10 is a plurality of spring retainers 30 positioned on a first plane 32 perpendicular to pipe 10. There are preferably at least three spring retainers 30 placed around pipe 10. For each spring retainer 30 on first plane 32 there is a corresponding aligned spring retainer 33 on a second plane 34. Second plane 34 is parallel to first plane 32 and perpendicular to clamp 70. Clamp 70 may be adjacent to pipe 10, but is preferably about a centimeter distant. Clamp 70 is generally cylindrical but typically defines opening 85.

In a preferred embodiment, flexible header joint 1 is intended for use with high performance headers, such as those used with racing vehicles. Such high performance headers experience much more movement and external forces than do headers in normal passenger cars.

Each spring retainer 30, 33 preferably comprises a base 35 welded to spring retention clamp 70 or pipe 10 as applicable; first and second nuts 40, 45; first and second washers 50, 55; and spring hook 60. Springs 65 are attached to each aligned pair of corresponding spring retainer 30, 33 thereby connecting pipe 10 with clamp 70. Other means of retaining springs are known in the art and can be used to retain springs 65, such as loops.

Figure 3:
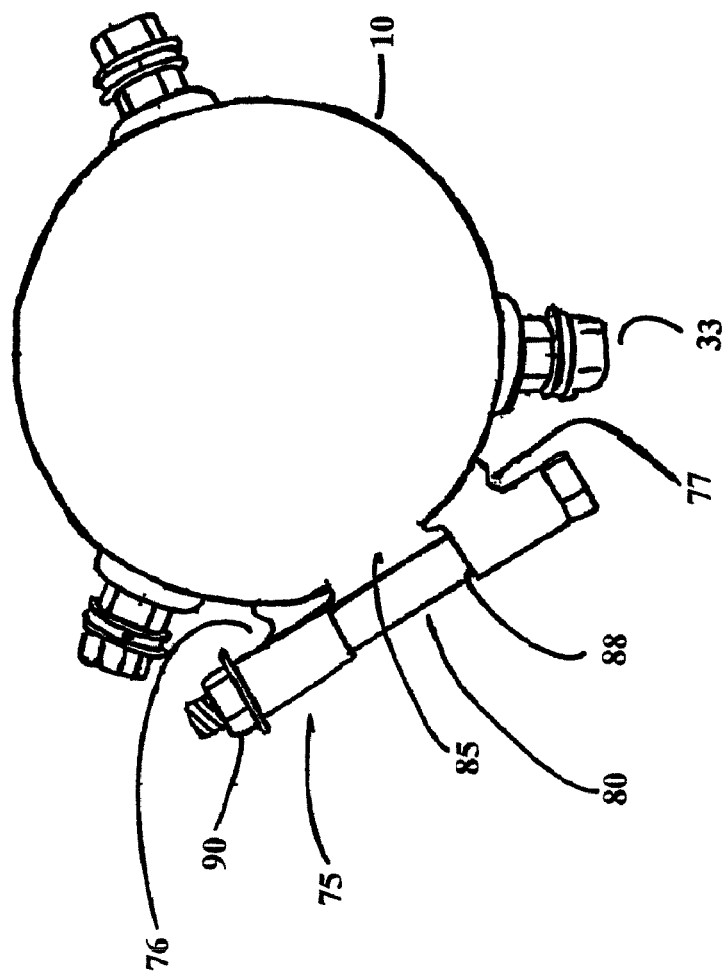
FIG. 3 is a front view of the flexible header joint according to the invention.
Figure 4:
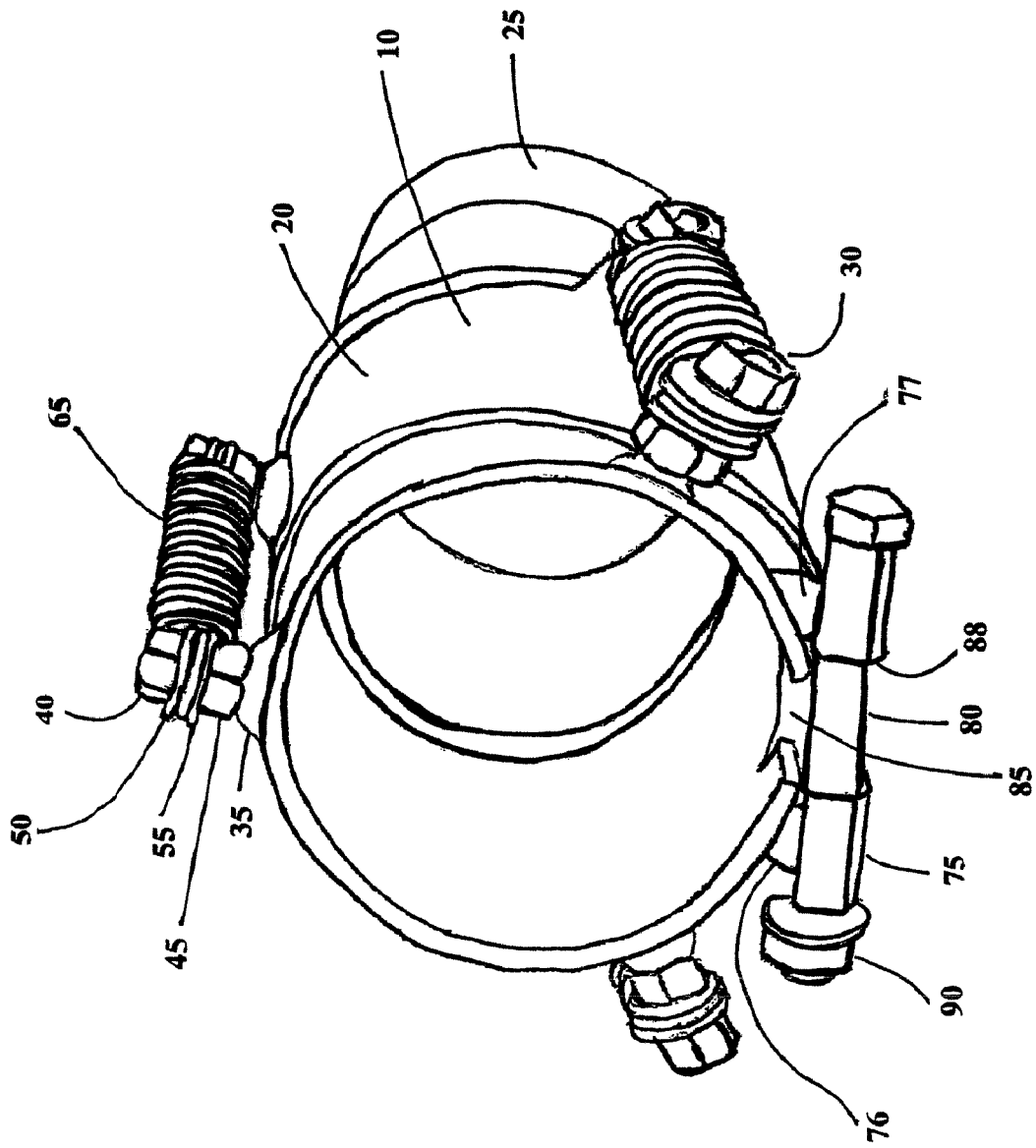
FIG. 4 is a perspective view thereof.

As best seen in FIGS. 3 and 4, positioned on clamp 70 is spring mount clamp 75 made up of first and second mounts 76, 77, and pinch bolt 80. Mounts 76, 77 each have aperture 88 to receive bolt 80. At one end of bolt 80 is a nut 90. Nut 90 can be tightened to secure clamp 70 to collector 15.

In operation springs 65 allow clamp 70 to move horizontally, i.e. the distance between clamp 70 (and therefore collector 15) and pipe 10 can vary without cracking or damaging joint 1 or the seal between pipe 10 and collector 15. Likewise, springs 65 allow collector 15 and clamp 70 to rotate or twist relative to pipe 10 without leakage or damage to the seal or joint. This permitted movement, both horizontally and rotationally, provides the flexibility necessary to reduce or eliminate breakage and leakage of the seal between collector 15 and pipe 10. The flexible header joint 1, properly used, can therefore withstand large amounts of heat and forces produced by the exhaust system and motion of the engine within its mount and the automobile.

To install the flexible header joint 1 the collector 15 is preferably at least a minimum length (typically about 4.5" inches) so that clamp 70 can be used effectively. If collector 15 is too short, the spring retainers 33 can be welded directly to the header, and clamp 70 need not be used. Alternatively, the collector 15 can be lengthened prior to installation.

Any previously installed header reducers should be removed from the existing exhaust system and the exhaust pipes should be stored out of the way. The sealing flange should be removed from the collector to leave as much length as possible in the collector. Preferably the end of collector 15 is as close as possible to being square shaped to aid in the initial sealing with the flexible header joint 1. Then tension springs 65 are then unattached from clamp 70. Clamp 70 and as much of the flexible header joint 1 as possible is then slid onto collector 15 until the end of collector 15 contacts sealing surface 190 (this can be done with tools as simple as a hammer and a block of wood placed on the end of the flexible header joint). Clamp 70 is then slid to a position typically about ½"-¼" from the pipe 10. Clamp 70 is then tightened by tightening spring mount clamp 75 (it should not be over tightened as doing so may damage collector 15). Springs 65 are then reattached to clamp 70 by using the nuts 40, 45, washers 50, 55, and spring hook 60 in the appropriate order. To position springs 65 a tool such as a small vice grip may be used. Spring hook 60 is grasped tightly and pulled to spring retainer 30. The exhaust pipes are then reattached using the stepped section of the flexible header joint 1. The exhaust pipe may be cut to the appropriate length and either welded or clamped to the flexible header joint 1.

While the principles of the invention have now been made clear in the illustrated embodiments, it will be immediately obvious to those skilled in the art that many modifications may be made of structure, arrangements, and algorithms used in the practice of the invention, and otherwise, which are particularly adapted for specific environments and operational requirements, without departing from those principles. The claims are therefore intended to cover and embrace such modifications within the limits only of the true spirit and scope of the invention.

What is claimed is:

1. An exhaust system, comprising:
    (a) a header collector;
    (b) an exhaust pipe; and
    (c) a flexible header joint, said header joint comprising:
        (i) a cylindrical pipe having a horizontal axis, said pipe shaped to receive said header collector horizontally at a first end thereby forming a seal to prevent leakage of exhaust, and receive said exhaust pipe of an automobile horizontally at a second end; and at least three spring retainers circumferentially positioned on said cylindrical pipe;
        (ii) a cylindrical clamp positioned near said first end of said cylindrical pipe, and at least three spring retainers circumferentially positioned on said clamp on a common plane perpendicular to said axis, each of said spring retainers on said clamp aligned with one of said spring retainers on said cylindrical pipe; said cylindrical clamp positionable around said header collector,
        (iii) at least three springs, a first end of each spring secured to one of said spring retainers positioned on said cylindrical pipe and a second end of each spring secured to said spring retainer on said clamp aligned to said spring retainer on said cylindrical pipe;
    wherein said clamp, during operation of the automobile, maintains said seal during rotation or twisting of said header collector relative to said joint.

2. The flexible header joint of claim 1 further comprising a spring mount clamp.

3. The flexible header joint of claim 2 wherein said spring mount clamp comprises:
    a) first and second mounts; and
    b) a pinch bolt.

4. The flexible header joint of claim 3 wherein said spring retainers positioned circumferentially on said cylindrical pipe are positioned on a first plane perpendicular to said axis.

5. The flexible header joint of claim 4 wherein said spring retainers positioned circumferentially on said clamp are positioned on a second plane parallel to said first plane.

6. The flexible header joint of claim 5 wherein said cylindrical pipe narrows from said first end to said second end in a stepped fashion.

7. The flexible header joint of claim 1 wherein said clamp further comprises a first end and a second end separated by an opening.

* * * * *